United States Patent [19]
Wildman et al.

[11] 3,869,856
[45] Mar. 11, 1975

[54] METHOD OF MAKING A CHAIN LINK

[75] Inventors: Claude L. Wildman, Thomson, Ill.; George A. Hellmer, Maquoketa, Iowa

[73] Assignees: Richard A. Kummerer; Alfred D. Besten, both of Fulton, Ill. ; part interest to each

[22] Filed: Apr. 4, 1974

[21] Appl. No.: 457,802

[52] U.S. Cl. .......................................... 59/8, 59/13
[51] Int. Cl. .............................................. B21l 11/06
[58] Field of Search .............. 59/5, 6, 8, 13, 14, 15, 59/35; 74/250 R, 250 C, 248, 245 R, 245 C

[56] References Cited
UNITED STATES PATENTS

| | | | |
|---|---|---|---|
| 2,272,837 | 2/1942 | Getz | 74/250 R |
| 2,938,329 | 5/1960 | Onulak | 59/8 |
| 2,968,913 | 1/1961 | Onulak | 59/6 |
| 3,054,301 | 9/1962 | Kummerer | 74/250 R |
| 3,153,897 | 10/1964 | Kummerer | 59/8 |
| 3,221,490 | 12/1965 | Onulak | 59/13 |
| 3,359,814 | 12/1967 | Kummerer | 74/245 R |
| 3,596,527 | 8/1971 | Besten | 74/229 |

Primary Examiner—C. W. Lanham
Assistant Examiner—Gene P. Crosby

[57] ABSTRACT

A method of making a chain link for a pintle chain from an elongated metal strap comprising the steps, forming pin-receiving openings adjacent the ends and adjacent the center, forming the strap into a U-shaped member in which the opening are opposite one another and the closed end of the member has excessive material and is of a semi-circular shape, gripping the side of the U-shaped link and forming the end into an arcuate-shape whose inner surface would bear against a pin extending through the openings at that end, and utilizing the excess metal at the end of the U-shaped member by forcing it into the sides and end of the link to thereby thicken the ends and the arcuate-shaped end.

9 Claims, 11 Drawing Figures

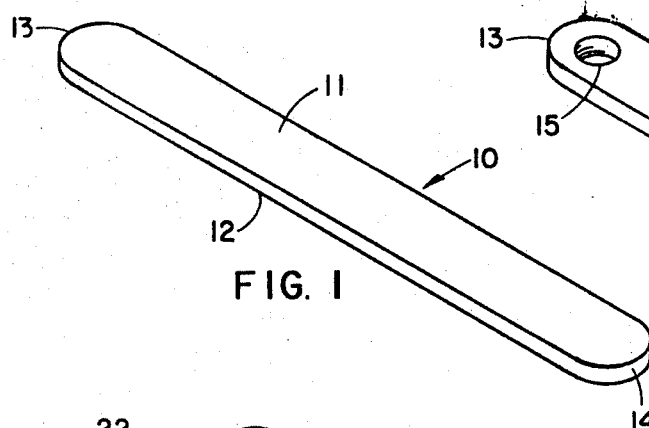
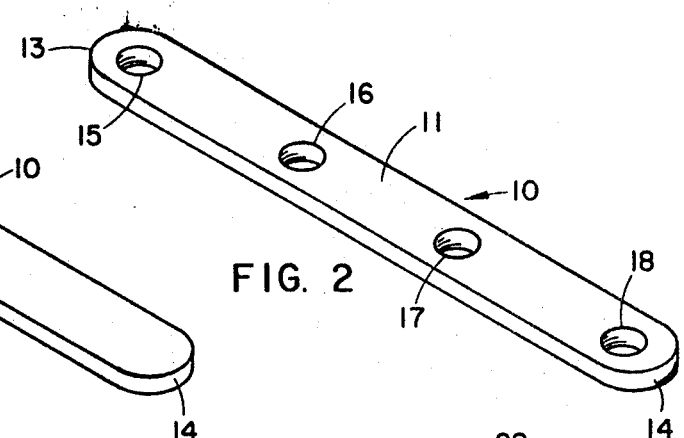
FIG. 1  FIG. 2
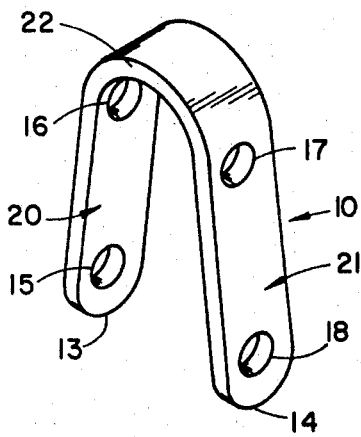
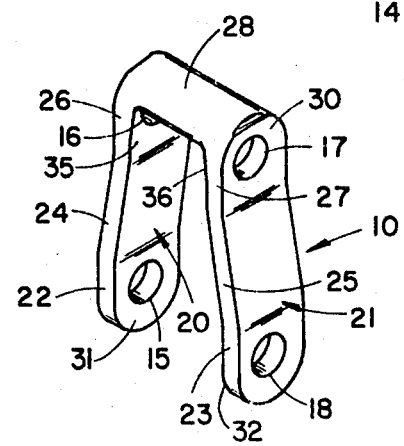
FIG. 3  FIG. 4
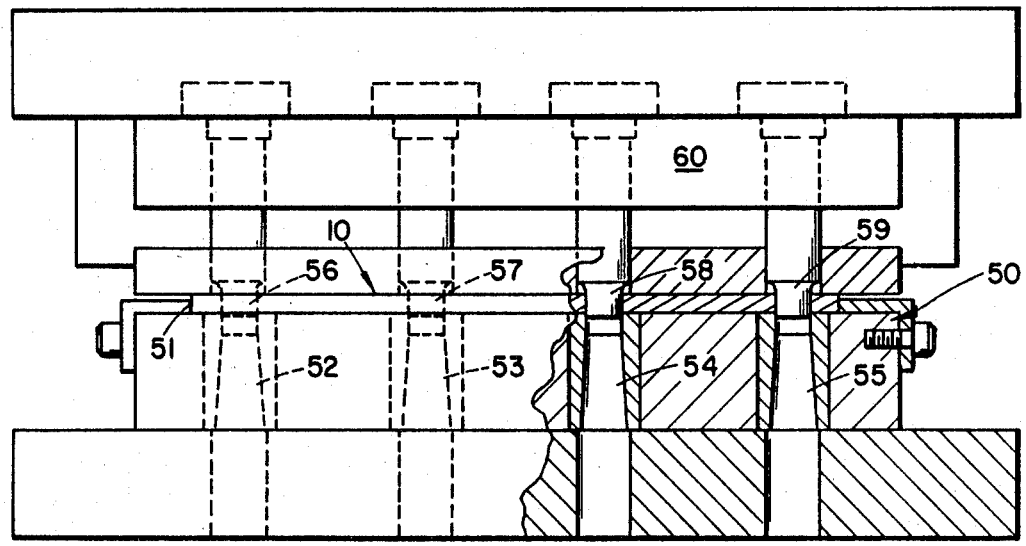
FIG. 5

METHOD OF MAKING A CHAIN LINK

BACKGROUND OF THE INVENTION

It has been conventional in the past to make a pintle link from a single strap of metal by forming the strap into a U-shaped member and while stretching it into the U-shaped member, to also form the arcuate end of the link. The arcuate end is formed about an axis of a chain link pin that extends across the pin openings at the closed end of the link. This method of making a chain link stretches the link at its openings and corners. This causes problems in that the grain of the link is realigned to run in the direction of stretching. Also, this tends to weaken the link at the corners of the U and also to stretch or elongate the openings for the pin. Thus, at the very location that is desirable to have strength in the link, the link is at its weakest.

SUMMARY OF THE INVENTION

With the above in mind, it is the primary object of the invention to provide a new method of making chain links which strengthen the chain link at the very area in which it would otherwise be weak. The method comprises the step of forming from a single elongated strap a U-shaped member with an excess of material at the loop or closed end of the U. This is followed by the step of gripping the sides and providing enlarged cavities for the side sections at the closed end of the U and compressing the closed end of the loop into an arcuate-shaped section and to force the excess material at the closed end of the U-shaped member down into the cavities for the side sections adjacent the closed end, also into the corners, and into the arcuate-shaped end of the U-shaped member. A wedge-shaped opening or cavity is provided for the sections of the sides of the link adjacent the arcuate-shaped or closed end which will receive the excess material. Thus, by this method of manufacturing a link, the link receives additional strength at its corners and along its sides at the pin openings. This has in the past been the weak point or points of the link and this greatly strengths the link. Also, by compacting or compressing the excess material into these locations, the grain of the link at its closed end and along the sides at its closed end becomes more homogeneous and even further adds strength to the link.

BRIEF DESCRIPTION OF THE DRAWINGS

FIG. 1 is a perspective view of a metal strap that is used in forming a chain link.

FIG. 2 is a perspective view of the same strap shown with the pin holes punched therein.

FIG. 3 is a perspective view of the strap as shown in FIG. 2 formed in a U- or V-shape.

FIG. 4 is a perspective view of the chain link after the final step in forming the link from the member shown in FIG. 3 has occurred.

FIG. 5 is a side view, partially in section, showing the die and the strap as the holes are being pierced so that the strap will appear as is shown in FIG. 2.

DESCRIPTION OF THE PREFERRED EMBODIMENT

Figure 6:
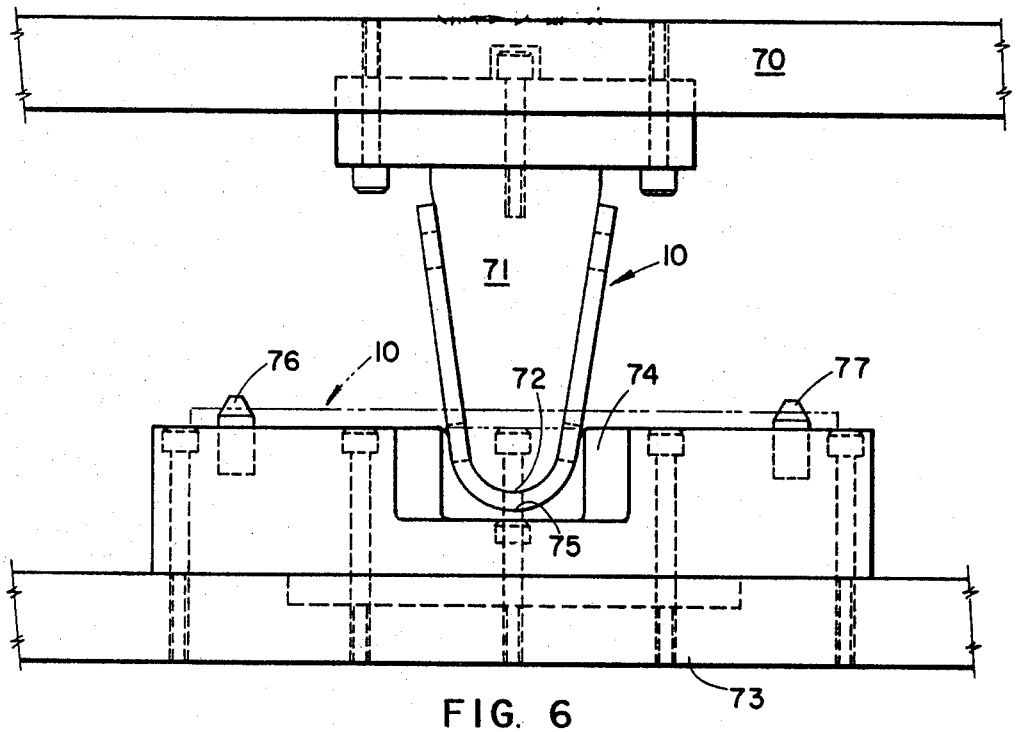
FIG. 6 is a view similar to FIG. 5 but showing the die required to form the strap as shown in FIG. 3.

The manner in which the links of the present invention is formed into chains is generally described in U.S. Pat. Nos. 3,153,897; 3,054,301; 3,359,814 and 3,596,527. Consequently, the present invention generally relates to improved links and the method of constructing the improved links. Reference may, however, be made to those patents showing the details of the means of connecting the links and to the connecting pins.

Referring now to FIGS. 1–4, the link is formed from an elongated steel strap 10 that has opposite surfaces 11, 12. It is rounded at its ends 13, 14. The strap 10 is first placed in a jig, as is shown in FIG. 5, and pin-receiving openings 15, 16, 17, and 18 are pierced through the strap. Openings 15, 18 are adjacaent the ends 13, 14, and openings 16, 17 are centrally located with each being offset equidistance from the midlength of the strap 10.

Following the piercing of the holes 15, 16, 17, and 18, the strap 10 is placed in a fixture as shown in FIG. 6 and the strap 10 is formed into a U- or V-shaped, as shown in FIG. 3. The V-shaped member has opposite sides 20, 21 joined by a semi-circular or looped end 22. The openings 16, 17 are transversely alinged across the link and the openings 15, 18 are similarly aligned.

Figure 10:
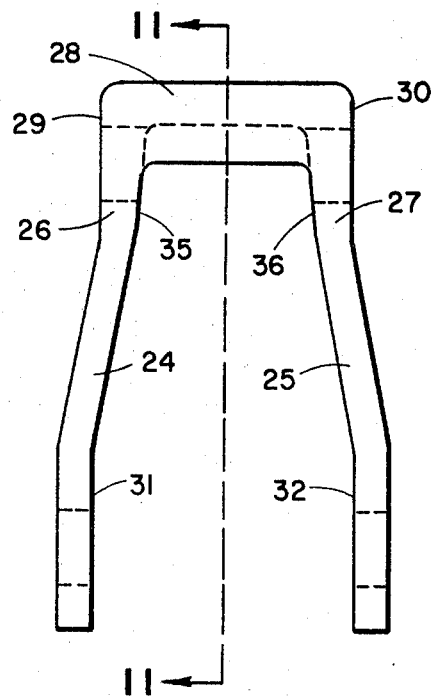
FIG. 10 is a plan view of the link as shown in FIG. 4.
Figure 11:
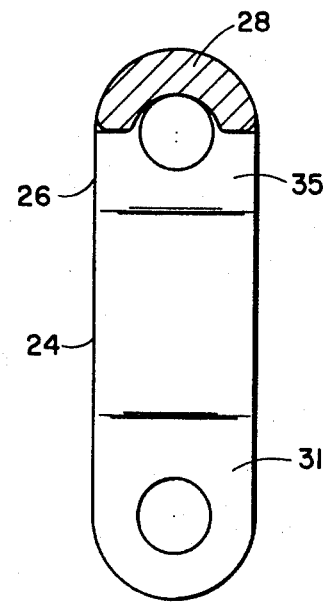
FIG. 11 is a sectional view taken along the line 11—11 of FIG. 10.
Figure 7:
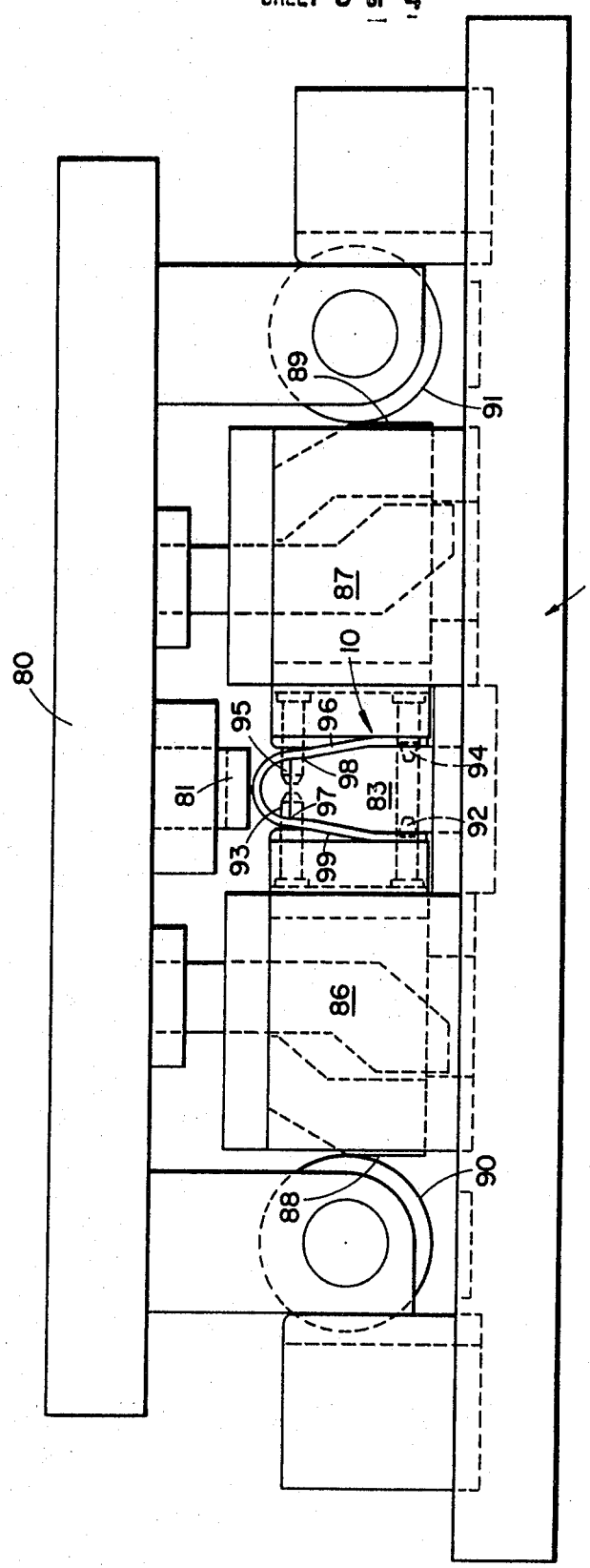
FIG. 7 is a view similar to FIG. 6 showing a further die and fixture for forming the first part of the link as shown in FIG. 4.
Figure 8:
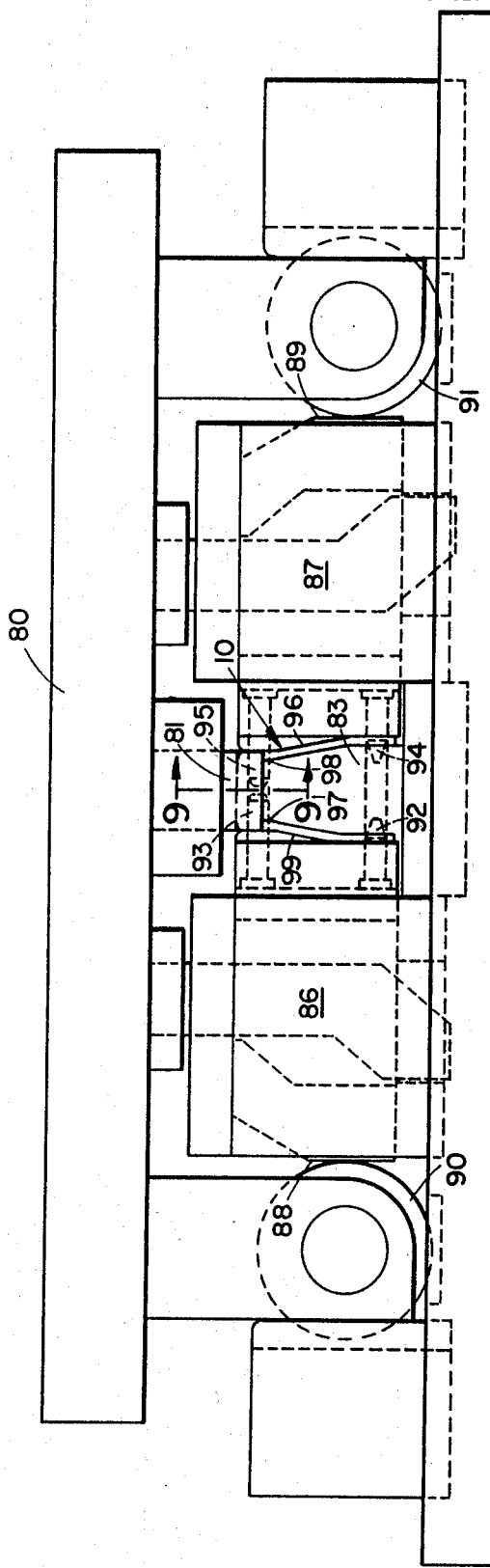
FIG. 8 is a view identical to FIG. 7 but showing the final step in forming the strap shown in FIG. 4.
Figure 9:
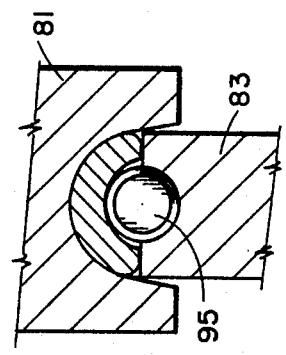
FIG. 9 is an enlarged sectional view as taken along the line 9—9 of FIG. 8.

The link, as shown in FIG. 3, is then placed in a die or fixture shown in FIGS. 7–9 and the final forming or shaping of the link, as shown in FIG. 4 occurs. The link, as shown in FIGS. 4, 10 and 11 has sides 20, 21 with end sections 22, 23 at the free or open end of the link, continuing inwardly diverging midsections 24, 25 that extend from the section 22, 23 inwardly to join with opposite end sections 26, 27 that join with an arcuate-shaped crosspiece 28 formed from the previous semi-circular loop 22. The crosspiece 28 is arcuate-shaped so that a pin extending through the openings 16, 17 will bear against the inner surface thereof. The final link, as shown in FIG. 4, has its free end sections 22, 23 outwardly offset with respect to the end sections 26, 27 and generally so that the outer surfaces 29, 30 are offset inwardly from the inner surfaces 31, 32 of the sections 22, 23. The surfaces 29, 30 are generally parallel and normally fit inside of the surfaces 31, 32 of an adjacent link in a chain. As is clearly apparent from viewing the previously referred to patents, pins are normally provided that extend through the openings 15, 18 and the openings 16, 17 of adjacent links.

Inner surfaces 35, 36 of the sections 26, 27 converge inwardly with respect to the outer frames 29, 30 from their point of juncture with the midsections 24, 25 to their point of juncture with the crosspiece 28. It should therefore be understood that due to the construction or forming of the present link, material is packed in the upper section of the link so that in the normal areas of the link where stress may occur, the respective portions of the link is substantially thicker than the remainder of the link. This is particularly true at the corner sections between the crosspiece 28 and the sections 26, 27. Reviewing FIG. 10, it will be noted that the corner thickness is substantially greater than the thickness of the midsections 24, 25 or the end sectinos 31, 32. Also, around the openings 16, 17, thickness of the link is increased. Thus, at the points of normal failure of links, the present link has additional strength built in.

Referring now to FIG. 5, the die tool utilized in the piercing or making of the holes 15–18 is composed of a basic fixture having an upper recessed surface 51 that may receive the metal strap in the form shown in FIG. 1. The base of the fixture 50 is provided with openings 52, 53, 54, and 55 through which the slugs from the openings or holes 15–18 may drop. The upper ends of the openings 52–55 receive the lower ends of piercing or hole-punching tools 56, 57, 58, and 59 that cut through and form the openings 15–18. The tools 56–59 are carried by an upper tool carrier 60 that is suitably powered to force the tools 56–59 downwardly to form the respective openings, the exact type of power and the means of providing the power not being shown since such may be conventional and any of a multitude of kinds used in such work.

Following forming of the openings shown in FIG. 5, the link is transferred to a fixture as shown in FIG. 6. The die or fixture shown in FIG. 6 is composed of upper portions 70 that rigidly carries a rigid male die 71 having a lower nose end 72 that is rounded. A lower portion 73 of the fixture carries a female die portion 74 that is aligned with and has a substantially semi-circular opening 75. Outboard and equally spaced from the fixture 74 are a pair of pilot lugs 76, 77 that are the same size as and are received in the openings 15, 18 of a metal strap 10 as shown. Again suitable power means are provided between the upper portion 70 of the fixture and the lower portion 73 of the fixture to force the fixtures together and to separate them when necessary.

In operation the die shown in FIG. 6 operates as follows: The strap 10 leaving the fixture of FIG. 5 is placed on the lower fixture bed 73 so that the pilot lugs 76, 77 are received or sit in the openings 15, 18. In this location, the strap 10 is properly positioned. The due 71 is then lowered to force the strap 10 into its U- or V-shaped form as shown in FIGS. 3 and 6. Upon raising the upper fixture 70, the link 10 may be removed.

The V-shaped link 10 is then moved into the die shown in FIGS. 7, 8 and 9. The die or fixture shown is composed of an upper fixed portion 80 having a depending female die 81. The fixture also includes a vertically-movable lower section 82 that carries a male die 83. The lower fixture 82 also carries a pair of horizontally-shiftable die members 86, 87 that fit on opposite sides of the die 83. The outer ends of the die members 86, 87 have cam edges 88, 89 that bear against rollers 90, 91. The inner portions of the members 86, 87 carry pilot pins 92, 93 and 94, 95, respectively, that are received in openings 15, 16 and 18, 17, respectively. Again, power means for forcing the entire die fixture 82 upwardly is provided although not shown in detail. Any type of conventional power may be used to provide such shifting.

Referring first to FIG. 7, the U- or V-shaped member link removed from the die as shown in FIG. 6 is placed in a position on the die of the fixture shown in FIGS. 7–9. The pilots 92–95 are first inserted into the openings 15–18 and the entire fixture 82 then raised so that the cam surfaces or edges 88, 89 engage the rollers 90, 91, thereby forcing the members 86, 87 inwardly. Opposite outer surfaces of the male die 83 is shaped to form the inner surfaces of the sides of the link. Complementary surfaces 95, 96 are provided on the inner ends of the die members 86, 87 and cooperate therewith to shape the offset and end sections 22, 23 and 26, 27 of the link. This, of course, leaves the upper looped end 22 still intact, such being shown in FIG. 7. It should here, however, be noted that due to the operation of the dies 86, 87 the sides of the link being formed is tightly gripped prior to and during the forming of the upper crosspiece. Referring now to FIG. 8, the fixture 82 is continued upwardly until the upper semi-circular or looped end 22 of the link engages the female undersdie of the die 81. Since there is an excess of material in the section 22, as the fixture 82 continues upwardly it forces material down into the top of the linkk thereby making a crosspiece thicker than the remainder of the link. Also, it should here be noted that the upper section of the male die 83 is tapered as at 97 and 98. The tapered sides 97, 98 of the upper portion of the male die 83 form tapered openings with their opposite counterpart surfaces of die members 86, 87. Consequently, as material is forced from the loop or semi-circular end 22 downwardly it is forced also into the openings formed by the tapered surfaces 97, 98. This material will then wedge itself in the die so that the additional material being forced down will be resisted by this wedging action. This wedging action prevents distortion of the openings 15–18 which might otherwise remain due to the enormous pressure between the fixtures 80, 82. Also, since the pilot pins 92–95 fix the openings 15–18, exact pitch of each link is maintained during the die-forming operation.

While not shown, suitable means are provided for separating the die blocks 86, 87 and the sections 80, 82 so that the link may be removed. It should also be recognized that various dies shown in FIGS. 5–8 may be placed on a machine so that the links are formed continuously without removal from the machine.

By compressing the head 28 and the side sections 26, 27 as descried forces realignment of the grain in the strap 10. Thus, while the forming of the chain links as described in the aforementioned patents caused the grain therein to run lengthwise and somewhat weaken the links, the present method of forming the links causes the grain to become more homogenous and thus strengthen the link.

We claim:

1. A method of making a pintle chain link from a U-shaped metal strap in which the closed end is looped; providing an abutment at said closed end for forming an arcuate-shaped end at said closed end; gripping said sides of said U-shaped strap, and while gripping the sides compressing the loop end against the abutment to form the arcuate-shaped end and forcing excess material of the loop end into the sides adjacent the closed end.

2. The method as defined in claim 1 characterized by a further step of compressing the loop end against the abutment to thicken the material as it is pressed thereagainst.

3. A method of making a pintle chain link from a U-shaped metal strap in which the closed end is looped; providing an abutment upon which the looped end may be pressed against to form an arcuate-shaped end upon which a chain link pin may journal and providing cavities on opposite sides of the abutment; gripping the sides of the U-shaped strap; and while gripping the sides, forcing material of the looped end against the abutment and into the cavities.

4. A method of making a U-shaped pintle chain from a metal strap comprising: making pin-receiving openings including two adjacent opposite ends and two adjacent the midpoint of the strap; bending the strap into a U-shaped member with two sides and a looped end at the closed end of the U-shaped member and so that the two openings adjacent the end and the midpoint are transversely aligned and opposite one another across the opening between the sides; gripping the sides of the U-shaped member spacedly from the looped end and inserting pins in said openings; and while gripping the sides compress the loop end to form an arcuate-shaped end about the pins at the closed end.

5. A method of making a link for a pintle chain from an elongated metal strap comprising: making two pin openings in the strap adjacent the ends and two pin openings adjacent to and off-set from the longitudinal midsection, bending the strap into a U-shape so that the openings are across from and are aligned with one another; inserting pins in the openings for retaining the shape of the openings; and while the pins are inserted compressing the closed end of the U-shaped strap into an arcuate shape end formed at least partially about an axis extending across the strap.

6. The method as defined in claim 5 in which the portion of the U-shaped strap extends considerably from the openings at that end and whereby the compressing of the end into the arcuate shape also compresses it to a thickness greater than the thickness of the strap.

7. The method as defined in claim 5 wherein the step of compressing the end into the arcuate shape compresses the end of the strap against the pins and the openings so as to form the arcuate end about the pins.

8. A method of making a pintle chain from an elongated metal strap comprising: making four pin-receiving holes in the strap with two adjacent the ends and two offset from the longitudinal center of the strap; bending the strap into a U-shape with the holes at the ends being opposite one another and the two offset from the longitudinal center being opposite from one another and so that the strap has two sides joined by a semi-loop section; gripping the sides of said U-shaped strap and while gripping the sides, compact the semi-loop section toward the sides to form a pin-bearing transverse crosspiece that is arcuately formed to bear against a pin extending through the openings and while forming the crosspiece to force material of the strap into the crosspiece and into portions of the sides adjacent the crosspiece.

9. A method of making a link for a pintle chain from an elongated metal strap comprising: making two pin-receiving openings in the strap adjacent the ends and two pin-receiving openings adjacent to but equally off-set from the longitudinal center of the strap; shaping the strap into a U-shape and so that the pin-receiving openings are aligned across the link; filling at least the pin-receiving openings adjacent the closed end of the U-shaped strap; gripping the sides of the link; and while said openings are filled and said sides are gripped compressing the closed end of the U-shaped strap into a pin-bearing arcuate end at said filled openings while at the same time forcing excess material in the closed end of the strap around said filled openings and into said arcuate end to thereby thicken those portions of the link.

* * * * *